E. H. WAUGH & W. J. SWARTZ.
PREPARING AND DEPOSITING APPARATUS FOR CONFECTIONERY.
APPLICATION FILED JAN. 20, 1913.

1,227,713.

Patented May 29, 1917.

Witnesses:
James E. Sproll.
Clara A. Harm.

Inventors:
Edward H. Waugh.
William J. Swartz.

By Adams & Brooks
Attorneys.

E. H. WAUGH & W. J. SWARTZ.
PREPARING AND DEPOSITING APPARATUS FOR CONFECTIONERY.
APPLICATION FILED JAN. 20, 1913.

1,227,713.

Patented May 29, 1917.
4 SHEETS—SHEET 2.

E. H. WAUGH & W. J. SWARTZ.
PREPARING AND DEPOSITING APPARATUS FOR CONFECTIONERY.
APPLICATION FILED JAN. 20, 1913.
1,227,713.
Patented May 29, 1917.
4 SHEETS—SHEET 3.
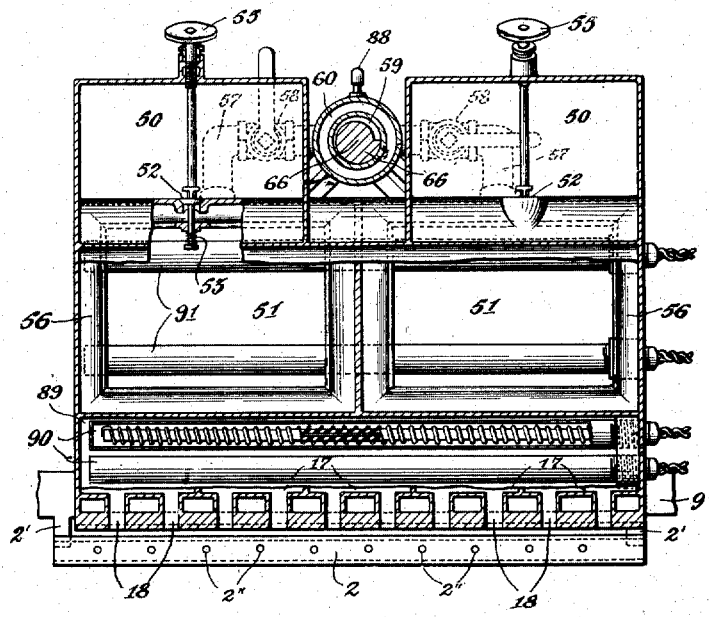
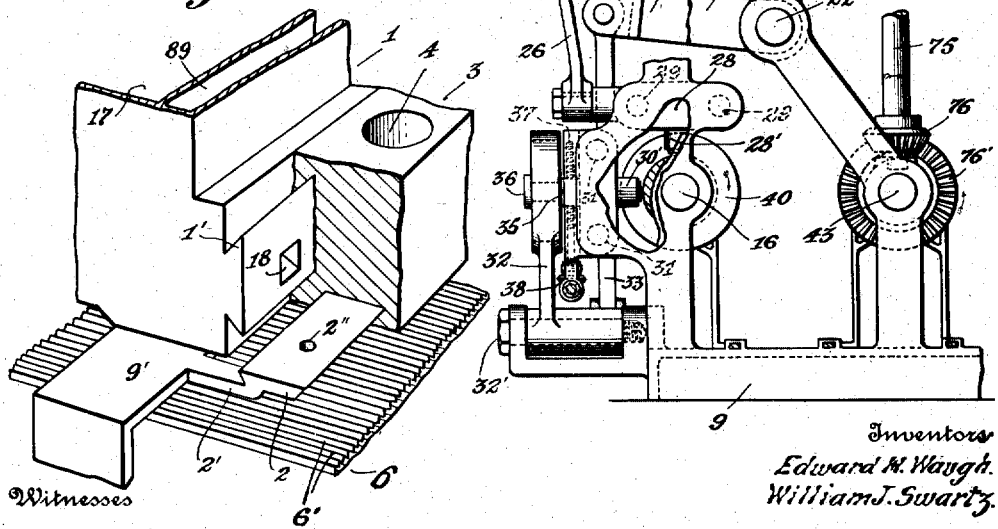

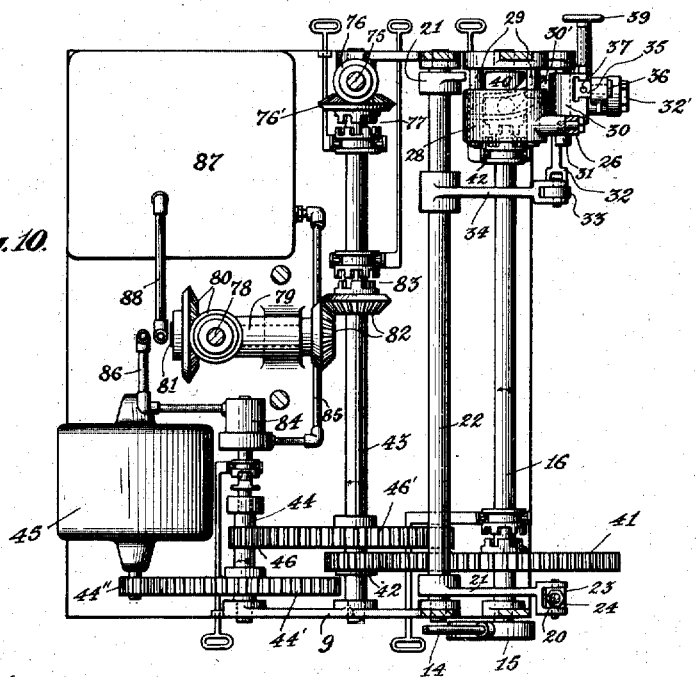
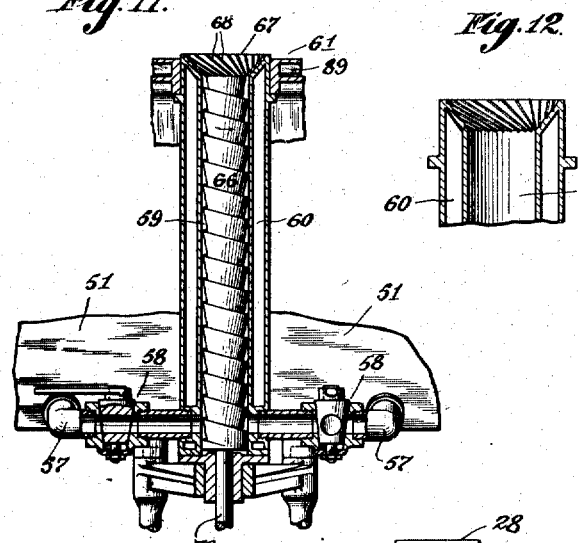
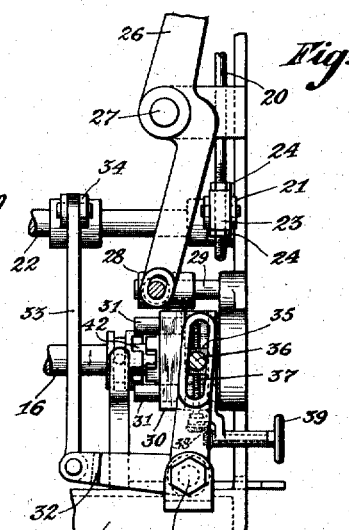
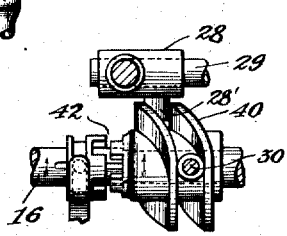

UNITED STATES PATENT OFFICE.

EDWARD H. WAUGH AND WILLIAM J. SWARTZ, OF SEATTLE, WASHINGTON, ASSIGNORS TO AUTOMATIC CANDY MACHINE COMPANY, OF SEATTLE, WASHINGTON, A CORPORATION OF WASHINGTON.

PREPARING AND DEPOSITING APPARATUS FOR CONFECTIONERY.

1,227,713. Specification of Letters Patent. Patented May 29, 1917.

Application filed January 20, 1913. Serial No. 743,118.

*To all whom it may concern:*

Be it known that we, EDWARD H. WAUGH and WILLIAM J. SWARTZ, citizens of the United States, residing at Seattle, in the county of King and State of Washington, have invented certain new and useful Improvements in Preparing and Depositing Apparatus for Confectionery, of which the following is a specification.

Our invention relates to machines of the above type and has for one of its objects to provide novel depositing mechanism for the prepared confectionery mixture.

A further object resides in the provision of mechanism through the medium of which the preparation of the confectionery mixture is effected.

We have shown a machine particularly designed for the production of candy wherein the raw material or materials are reduced by heat to a semi-liquid or molten condition, then, passed through other steps in the process of preparation following which the prepared mixture is delivered to the depositing mechanism.

Further objects of our invention therefore reside in the production of a machine of this character which is efficient in operation; wherein the several steps incident to the preparation of the confectionery mixture can be carried on with the desired efficiency.

These and other objects, as will hereinafter appear, are obtained in the construction shown in the accompanying drawings. Such construction while a preferred embodiment of our invention is susceptible of various changes or modifications without departing from the spirit of our invention which is particularly defined in our annexed claims.

In the drawings, wherein like characters of reference indicate like parts throughout:

Fig. 3 is a front elevation of the upper portion of the machine with portions broken away, and the conveyer or carrier in section.

Fig. 4 is a fragmentary plan of the machine with portions broken away.

Fig. 5 is a horizontal section through certain of the chambers taken on line 5—5 of Fig. 1.

Fig. 6 is a fragmentary perspective illustrating more particularly the three companion members of the depositing mechanism in conjunction with a carrier or conveyer of slightly modified form.

Fig. 7 is a fragmentary elevation with parts broken away of a portion of the actuating mechanism.

Fig. 8 is a fragmentary elevation of such mechanism taken at right angles to Fig. 7.

Fig. 9 is a detail illustrating the cam and actuating slides of this mechanism, the followers of these slides being in section.

Fig. 10 is a horizontal section through the lower portion of the machine.

Fig. 11 is a fragmentary vertical section showing more particularly the rotary devices for acting on the molten material prior to its delivery to the main supply chamber, and Fig. 12 is a fragmentary section of the chamber for such devices.

Figure 1:
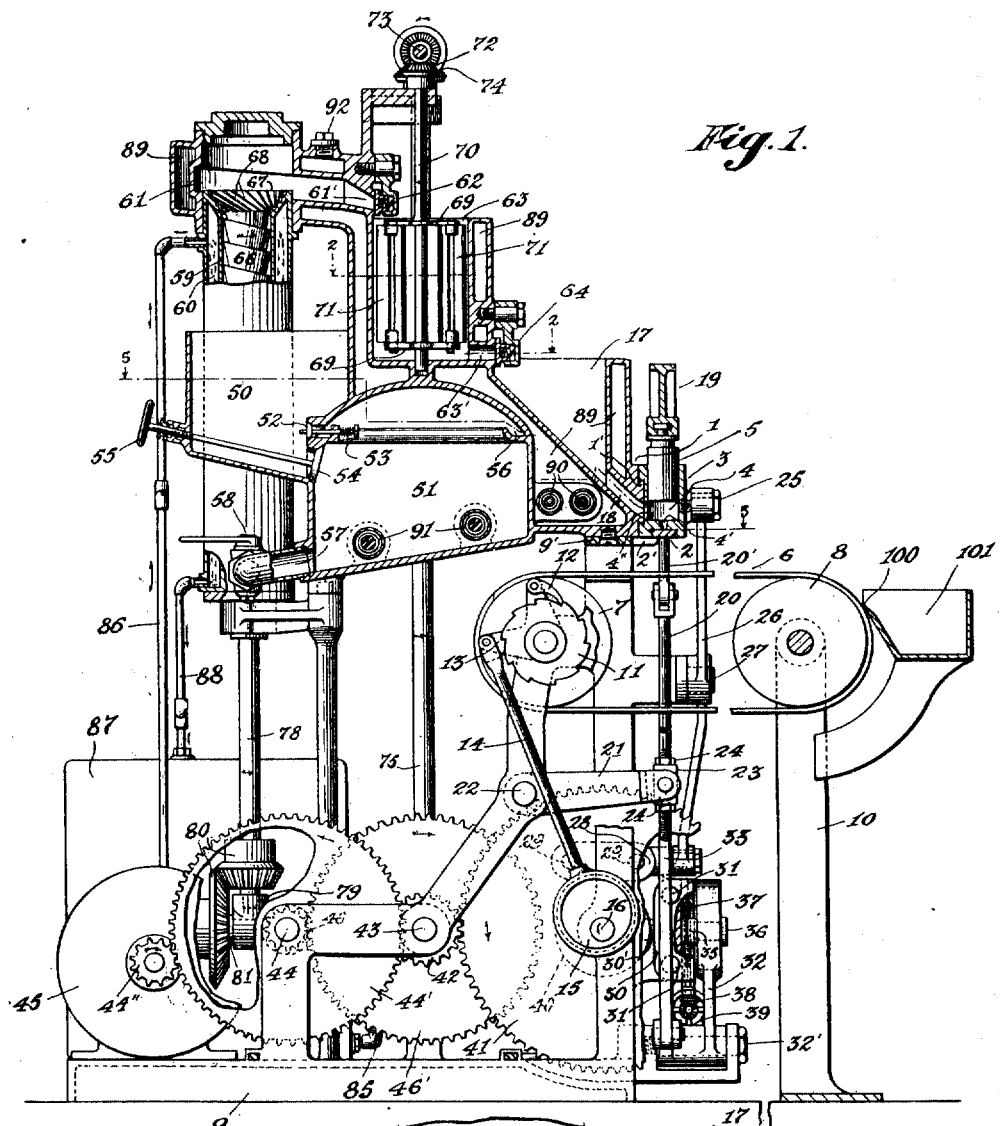
Figure 1 is a side view partly in elevation and partly in section, with parts broken away and a portion of the carrier or endless conveyer removed.
Figure 2:
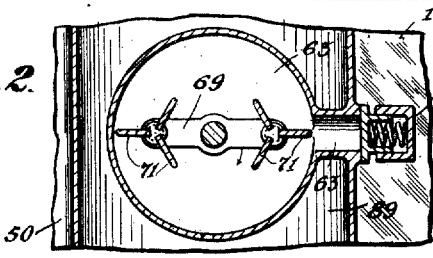
Fig. 2 is a fragmentary horizontal section through one of the flavoring or coloring containers taken on line 2—2 of Fig. 1.

Referring to the drawings by characters of reference, 1, 2 and 3 indicate companion parts, the latter of which is movable with respect to the first two named parts for controlling the intake and delivery of the confectionery mixture with respect to the depositing mechanism.

In our present construction we have disclosed a plurality of depositing devices comprising chambers 4 and plungers 5, from which the semi-liquid mixture is discharged intermittently onto an underlying carrier 6, which latter is of convenient length to insure of the deposits or products having ample time to cool and harden prior to their removal.

Carrier 6 comprises an endless belt taking over drive and idler rollers 7 and 8 respectively, the former of which is journaled in the main frame 9 of the machine and the latter in suitable stands 10.

Fixed to the axle of roller 7 is a ratchet wheel 11 with which a pawl 12 engages for imparting a step by step movement to carrier 6. Pawl 12 is pivoted on an angle lever 13, swingingly mounted on the axle of roller 7 and connected to a driving rod 14 which latter is provided with a suitable strap encircling an eccentric 15, fixed to a driven shaft 16, journaled on frame 9.

Companion part 3 which consists of a slide and is conveniently formed with the chambers 4, is formed in its lower, and inner vertical side faces with dove-tail grooves receiving respectively companion part 2 and a protuberance 1' of part 1, of corresponding cross sectional contour, for sliding movement thereon.

Companion part 2 is fixed to bracket extension 2' of a transverse frame member 9' and formed with ports 2'' adapted for registration with suitable delivery ports 4' of chambers 4.

Companion part 1 is shown as an integral part of a plurality of hoppers or containers 17 for the prepared mixture and leading from these hoppers or containers through part 1 are delivery ports 18 with which suitable ports 4'' of chambers 4 are adapted to register. In this connection it will be observed that ports 18 are arranged at one side of the related ports 2'' so that communication between the chambers 4 and their ports 18 will be established only when chamber ports 4' are closed against delivery by companion part 2. It will further be observed that the bottom walls of hoppers or containers 17 and the delivery ports 18 thereof are inclined, thereby enabling the molten or semi-liquid material, if it be of the proper consistency, flowing by gravity to the chambers 4. This however, under usual conditions, can hardly be depended upon to insure of the proper and uniformly perfect feed of the material to the chambers. Therefore, we, through the mechanism to be described, cause plungers 5 to move upwardly or on their suction stroke subsequently to the establishment of communication between ports 18, 4'' at which time part or slide 3 will be at rest. Another pause of part or slide 3 occurs when ports 4', 2'' are in registration and at this time plungers 5 are moved downwardly or inwardly to eject the material which falling on carrier 6 will, unless suitable molds are provided on the carrier, assume the form of thin disk-like bodies. All of the chambers discharging simultaneously, the discharged predetermined quantities of material will lie on carrier 6 in a transversely extending row, as will be apparent. A step like movement of carrier 6 now occurs to advance the deposits from beneath part 2.

Plungers 5 are connected to a head 19, pivotally connected by rods, formed of articulated sections 20, 20', with arms 21 fixed to a rock shaft 22, journaled on frame 9. To permit of the normal set of plungers 5 being varied we adjustably connect rod sections 20 with arms 21, this being accomplished by externally screw threading the lower end portions of the rod sections and loosely engaging the same in blocks 23 which are pivoted in the arms 21 and engaged by nuts 24 mounted on the rod sections.

Part or slide 3 is pivotally connected at 25 with actuating mechanism consisting of a lever 26, fulcrumed at 27 and having its lower end portion pivotally connected to an actuating slide 28, conveniently guided, for horizontal movement, on fixed pins 29 of frame 9.

Reference numeral 30 indicates a second actuating slide arranged at right angles to slide 28 and below the same and guided for horizontal movement on guide pins 31 of frame 9.

Actuating slide 30 transmits motion to a bell crank lever 32, fulcrumed at 32' and connected by a link 33 with an arm 34 of rock shaft 22. The connection between bell crank lever 32 and slide 30 is such that the throw of the bell crank can be altered to increase or decrease the length of stroke of the plungers and thereby obtain a variation in the quantity of material ejected. This connection consists of a slide block 35 slidably engaged in actuating slide 30 and provided with a pin 36 engaged in a slot of the lever.

Reference numeral 37 indicates a screw rotatably mounted on actuating slide 30 and having screw threaded engagement with slide block 35. This screw is rotated, to advance pin 36 along the slot of the bell crank lever, through bevel gearing 38, one of which gears is fixed to a shaft suitably journaled on slide 30 and provided with a hand wheel 39.

Actuating slides 28 and 30 are provided with followers 28', 30' which engage in the groove of a drive cam 40, loosely mounted on shaft 16, and adapted to be connected therewith by a suitable clutch 42.

The groove of cam 40 has alternating throw and rest portions (see Figs. 9 and 10) all of substantially the same length, and followers 28', 30' being set to engage in said groove at substantially 90° apart, one follower will obviously be just leaving a throw portion of the cam as the other follower enters the same, thereby giving a pause to one actuating slide during the operating of the other. This mechanism effects the operation of part or slide 3 and head 19, the upper rod sections 20' connected with head 19 swinging on the lower rod sections 20, during reciprocatory movement of part or slide 3, as will be readily understood.

Shaft 16 is provided with a spur gear 41 which meshes with a pinion 42 on an intermediate shaft 43, journaled on frame 9.

Reference numeral 44 indicates a drive shaft connected by gear 44' and pinion 44'', as for example, with a suitable motor 45 and communicating its motion to intermediate shaft 43 through meshing gears 46, 46' on the respective shafts.

Reference numerals 50, 50, 51, 51 indicate melting or cooking chambers, each of the chambers 50 communicating with a respective one of the chambers 51 through upper and lower ports, the former of which ports, which also serve as vents, are closed by valves 52, yieldingly held closed by springs 53, while the said lower ports are closed by manually opened valves 54, having their stems threaded in the walls of the adjacent chambers 50 and conveniently provided on their projecting end portions with hand wheels 55.

Extending around the upper portion of cooking chambers 51 are catch troughs 56 for water of condensation, and it is with these troughs that the upper ports or those controlled by valves 52 directly communicate, whereby upon the automatic opening of the valves through pressure of the steam generated, any collected water can escape with steam into chambers 50. By such construction, we can fill both the chambers 50 and 51 with material to be melted, as will hereinafter be more fully set forth, and utilize such of the steam and moisture as may escape from the chambers 51 upon opening of valves 52 in chambers 50, thereby obtaining an expeditious treatment of the material in an economical manner.

Chambers 51 are connected by passages 57, controlled by suitable valves 58, with apparatus for reducing the semi-liquid or syrupy mass to a creamy consistency.

This comprises a vertically disposed chamber 59 in which a rotary device 66 is snugly fitted, the same having a spiral external rib having one side face extending abruptly and the other tapering gradually outwardly from its root, see Fig. 11.

Reference numeral 67 indicates a rotary reducing head fixed to device 66 and formed with grinding ribs 68 extending spirally and in a reverse direction to that of the rib of device 66.

Head 67 tapers toward device 66 and is snugly fitted in the open upper end of chamber 59 which is flared and provided on its wall with spirally extending ribs set reversely to those of the head, to act conjointly therewith to reduce any solid particles in the mass, advanced by the rotary device 66.

Chamber 59 is surrounded by a water jacket 60 and communicates at its upper end portion with a main supply chamber 61, provided with a plurality of discharge ports 61', controlled by valves 62, and each communicating with a respective flavoring or coloring container 63 which containers in turn communicate through ports 63'; controlled by valves 64, with the adjacent hoppers or containers 17.

Within container 63 are stirrers these comprising upper and lower supports 69 fixed to vertical shafts 70 and having rotary bladed members 71 journaled in their outer end portions. These members 71 are each provided with three blades and being journaled in supports 69 will during rotating of shafts 70, be rotated about their own axes through counter action of the material and thereby tend to always direct the latter inwardly away from the side walls of the containers, in a manner insuring a more perfect mixing action.

Shafts 70 are connected through bevel gearing 72 with a cross shaft 73 journaled on bracket extensions of chamber 61, and driven through gearing 74 from a vertical shaft 75, which latter is provided on its lower end portion with a bevel gear 76 meshing with a loose gear 76' adapted to be connected to shaft 43 by a suitable clutch 77.

Reference numeral 78 indicates a shaft fixed to rotary device 66 and having its lower end stepped in a suitable bearing 79. This shaft is connected through gearing 80, an intermediate shaft 81 and gearing 82 with shaft 43, one gear of the gearing 82 being preferably loose on shaft 43 and adapted to be made fast thereto by a clutch 83.

For cooling the material while being acted upon by device 66 we provide a rotary pump 84, of any suitable type, which is connected with shaft 44. This pump is connected by pipes 85, 86 with a cold water tank 87 and water jacket 60 respectively.

Reference numeral 88 indicates a return pipe leading from water jacket 60 to tank 87.

Reference numeral 89 indicates a hot water jacket for containers 17, 63 and chambers 61, 51, the same having a filling aperture, closed by a plug 92, and being provided with suitable heaters, as 90 conveniently electric heaters of any well known type which have their resistance coils inclosed to prevent access of the water. Similar heaters, as 91 are also provided in cooking chamber 61.

In the operation of our invention, as when it is desired to produce a simple creamy candy, we open valves 54 and then insert through the ports controlled thereby a predetermined quantity of sugar to which is added water. Said valves 54 are then closed and chambers 50 filled or partly filled with sugar to which is added a smaller quantity of water than was placed in chambers 51. Heaters 91 are now rendered active to bring about the desired temperature in chambers 51, as for example 242° F. As these chambers 51 are vented through valves 52 opening automatically, as hereinbefore set forth, the escaping steam passes through the contents of chambers 50 thereby serving to heat and start the melting step, which will be completed in chambers 51, as will be understood in the following.

When the mixtures in chambers 51 have been melted, first one valve 58 is opened, then the other, to insure of a practically constant flow to chamber 59. As one chamber 51 empties, it is refilled by opening valve 54, Valves 62 and 64 are conveniently pivotally supported and provided with handles 62ª, 64ª respectively, whereby they can be opened to admit the mixture to the containers controlled thereby. Prior to the opening of valves 64, flavoring or coloring ingredients will have been worked uniformly into the mixture by the stirrers in containers 63.

Angle lever 13 is oscillated continuously and on its active stroke advances carrier 6, as hereinbefore set forth.

If desired we may provide a removing device 100, in the form of a scraper, which will remove the product from carrier 6 and direct the same into a suitable receiver 101, of any suitable construction.

In Fig. 6 we have shown the carrier in slightly modified construction. In this form the carrier or belt has its upper face formed with molding ridges or corrugations 6' extending in the direction of its length, these serving to form the bottoms or underfaces of the candies or products in a desired manner, whereby when the products are arranged in rows or in abutting relation to one another, channels or passages between the same, for the free circulation of air, will exist.

Having thus described our invention what we claim as new and desire to secure by Letters Patent of the United States of America, is:—

1. In apparatus of the character set forth, the combination with a chamber, of means for supplying material to the chamber, and means for permitting its discharge therefrom, a plunger movable in the chamber to discharge the material therefrom, said chamber and plunger being together bodily movable in a direction transverse to the ejecting movement of the plunger, to carry said chamber alternately into and out of coaction with the supplying and discharge-permitting means.

2. In apparatus of the character set forth, the combination with a chamber, of means for supplying material to the chamber, and means for permitting its discharge therefrom, a plunger movable in the chamber to discharge the material therefrom, said chamber and plunger having a reciprocatory bodily movement together in a direction transverse to the ejecting movement of the plunger, to carry said chamber alternately into and out of coaction with the supplying and discharge-permitting means.

3. In apparatus of the character set forth, the combination with a slide having a plurality of chambers, of means for supplying material to the chambers, and means permitting its discharge therefrom, plungers movable in the different chambers, and means for moving the slide and the plungers bodily in a direction transverse to the ejecting movement of the plungers, to carry said chamber alternately into and out of coaction with the supplying and discharge-permitting means.

4. In apparatus of the character set forth, the combination with a slide having a plurality of chambers, of means for supplying material to the chambers through the sides thereof, and means permitting its discharge therefrom through the bottoms, plungers movable in the upper portions of the chambers, said supplying and discharge-permitting means being out of alinement, and means for moving the slide and plungers bodily in a direction transverse to the ejecting movement of the plungers, to carry the chambers alternately into and out of coaction with the supplying and discharge-permitting means.

5. In apparatus of the character set forth, the combination with a chamber, of means for supplying material thereto and means for permitting its discharge therefrom, means associated with the chamber for effecting said discharge, an actuating device for the discharging means movable toward and from the chamber, and means for moving the chamber bodily in a direction transverse to the direction of movement of the actuating device, to alternately move the chamber into coaction with the supplying means and discharge-permitting means.

6. In apparatus of the character set forth, the combination with a chamber, of means for supplying material thereto and means for permitting its discharge therefrom, means associated with the chamber for effecting said discharge, an actuating device for the discharging means movable toward and from the chamber, said means having a slidable engagement therewith, and means for reciprocating the chamber and discharge means bodily in a direction transverse to the direction of movement of the actuating device, to alternately move the chamber into coaction with the supplying and discharge-permitting means.

7. In apparatus of the character set forth, the combination with a chamber, of means for supplying material thereto at one point and means for permitting its discharge therefrom at another point, a plunger movable longitudinally in the chamber for effecting its discharge, an actuating device for the plunger movable toward and from the chamber, and means for reciprocating the chamber and plunger transversely to the direction of movement of the plunger in the chamber, while maintaining a coacting relation between the actuating device and the plunger, to alternately move the chamber into coaction with the supplying means and discharge-permitting means.

8. In apparatus of the character set forth, the combination with a slide having a chamber therein, of means for supplying material thereto at one point and means for permitting its discharge therefrom at another point, a plunger movable in the chamber, a reciprocatory device movable toward and from the slide for actuating the plunger, said plunger having a sliding connection with the actuating device, and means for reciprocating the slide and plunger at substantially right angles to the direction of movement of the actuating device for carrying the chamber into and out of coaction alternately with the supplying and discharge-permitting means.

9. In apparatus of the character set forth, the combination with a slide having a plurality of chambers, of plungers for the different chambers, a single actuating device for the various plungers, means for supplying material to the different chambers and means for permitting its discharge therefrom, and means for actuating the slide to move the chambers and plungers bodily in a direction laterally to the movement of the actuating device, to carry the chambers alternately into and out of coaction with the supplying and discharge-permitting means.

10. In apparatus of the character set forth, the combination with a slide having a plurality of chambers, of plungers for the different chambers, a single actuating device for the various plungers movable toward and from the chambers, said plungers being slidably engaged with the said device, means for supplying material to the different chambers and means for permitting its discharge therefrom, and means for reciprocating the slide and plungers laterally in a direction transverse to the movement of the actuating device, to carry the chambers alternately into and out of coaction with the supplying and discharge-permitting means.

11. In apparatus of the character set forth, the combination with a chamber, of a plunger that reciprocates therein, feeding means for the chamber, means out of alinement with the feeding means for permitting the discharge from the chamber, and automatic mechanism for moving the chamber and plunger bodily back and forth between the feeding means and discharge-permitting means transversely of the direction of movement of the plunger, moving the plunger outwardly when the chamber is associated with the feeding means and moving the plunger inwardly when the chamber is associated with the discharge-permitting means.

12. In apparatus of the character set forth, the combination with a chamber, of a plunger that reciprocates therein, means for feeding material to the chamber, means out of alinement with the feeding means for permitting the discharge from the chamber, and automatic mechanism for reciprocating the chamber and plunger bodily between the feeding means and discharge-permitting means transversely to the direction of movement of the plunger, moving the plunger outwardly when the chamber is associated with the feeding means and moving the plunger inwardly when the chamber is associated with the discharge-permitting means.

13. In apparatus of the character set forth, the combination with a reciprocatory slide having a plurality of chambers therein provided with open ends and having inlet and discharge ports, of means for supplying material to the chambers, and means out of alinement with the supplying means for permitting the discharge from said chambers, plungers moving in the open ends of the chambers, a device movable toward and from the slide for simultaneously moving the plungers, said plungers being slidably engaged with the device, means for reciprocating the slide transversely to the direction of movement of the plungers in the chambers and permitting the slide to dwell with the chambers alternately in coaction with the supplying means and discharge-permitting means, and means for operating the device to move the plungers outwardly when the chambers are at rest in coaction with the supplying means, moving said plungers inwardly when said chambers are in coaction with the discharge-permitting means, and maintaining said plungers substantially at rest during the movement of the slide.

14. In apparatus of the character described, a slide provided with a chamber having inlet and outlet ports, relatively fixed means associated with said slide provided with feed and outlet ports, means for giving said slide a rectilinear reciprocation to bring the inlet and outlet ports of the chamber thereof into registration with the feed and outlet ports of said first named means in a successive manner, and means for automatically ejecting material from said chamber through its said outlet port.

15. In apparatus of the character described, a slide provided with a chamber having inlet and outlet ports, relatively fixed means associated with said slide provided with feed and outlet ports, means for giving said slide a rectilinear reciprocation to bring the inlet and outlet ports of the chamber thereof into registration with the feed and outlet ports of said first named means in a successive manner, a plunger in said chamber, and means for reciprocating said plunger.

16. In apparatus of the character described, a slide provided with a chamber having an inlet port in its side and an outlet port in its bottom, means at the side of the path of said slide communicating with a source of supply and provided with a feed port adapted for registration with the inlet port of the said slide chamber, means for giving said slide a rectilinear reciprocation, and means for ejecting material from said chamber through the bottom port when its inlet port is closed.

17. In apparatus of the character described, a slide provided with a chamber having inlet and outlet ports, means at the side of the path of said slide communicating with a source of supply and provided with a feed port adapted for registration with the inlet port of the said slide chamber, means for reciprocating said slide, a plunger in the chamber of said slide, and means for recpirocating said plunger, in a direction at substantially right angles to the direction of movement of the slide, successive strokes of said plunger occurring during successive rest periods of said chamber.

18. In apparatus of the character described, a slide provided with a plurality of chambers having inlet and outlet ports, supply means mounted at the side of the path of said slide, means for intermittently moving said slide horizontally for alternately establishing and cutting off communication of its chambers relatively to said supply means, and means for ejecting material from said slide-chambers simultaneously when the latter are at rest.

19. In apparatus of the character described, a slide provided with a plurality of chambers having inlet and outlet ports, supply means mounted at the side of the path of said slide, means for intermittently moving said slide for alternately establishing and cutting off communication of its chambers relatively to said supply means, plungers in the chambers of said slide, and means for reciprocating said plungers simultaneously during the pauses of said slide in a direction transverse to the direction of movement of the slide.

In testimony whereof we affix our signatures in presence of two witnesses.

EDWARD H. WAUGH.
WILLIAM J. SWARTZ.

Witnesses:
STEPHEN A. BROOKS,
CLARA A. HARM.

Copies of this patent may be obtained for five cents each, by addressing the "Commissioner of Patents, Washington, D. C."